(12) United States Patent
Ciabrini et al.

(10) Patent No.: US 12,515,808 B2
(45) Date of Patent: Jan. 6, 2026

(54) METHOD AND SYSTEM FOR ASSISTING THE PILOTING OF AN AIRCRAFT, AIRCRAFT EQUIPPED WITH SUCH A SYSTEM

(71) Applicant: AIRBUS HELICOPTERS, Marignane (FR)

(72) Inventors: Andrea Ciabrini, Porto-Vecchio (FR); Christian Gorges, Marseilles (FR); Christophe Skorlic, Salon de Provence (FR); Eric Vincent, Aix en Provence (FR); Emmanuel Chiariglione, Eguilles (FR); Guillaume Dumur, Salon de Provence (FR); Philippe Abbink, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 393 days.

(21) Appl. No.: 18/121,218

(22) Filed: Mar. 14, 2023

(65) Prior Publication Data

US 2023/0331395 A1 Oct. 19, 2023

(30) Foreign Application Priority Data

Apr. 15, 2022 (FR) ...................................... 2203512

(51) Int. Cl.
*B64D 43/00* (2006.01)
*B64D 31/00* (2006.01)
*G01C 23/00* (2006.01)

(52) U.S. Cl.
CPC ............. *B64D 31/00* (2013.01); *B64D 43/00* (2013.01); *G01C 23/005* (2013.01)

(58) Field of Classification Search
CPC ...... B64D 31/00; B64D 43/00; G01C 23/005; B64C 27/04
See application file for complete search history.

(56) References Cited

U.S. PATENT DOCUMENTS 5,915,273 A 6/1999 Germanetti
5,986,580 A 11/1999 Permanne
(Continued)

FOREIGN PATENT DOCUMENTS

CN 105416601 A 3/2016
FR 2749545 A1 12/1997
(Continued)

OTHER PUBLICATIONS

French Search Report for French Application No. FR2203512, Completed by the French Patent Office, Dated Nov. 15, 2022, 9 pages.
First Office Action for Japanese Application No. 2023-039286, dated Mar. 26, 2024, 4 Pages.

*Primary Examiner* — Peter D Nolan
*Assistant Examiner* — Demetra R Smith-Stewart
(74) *Attorney, Agent, or Firm* — BROOKS KUSHMAN P.C.

(57) ABSTRACT

The present disclosure relates to a system and a method for assisting the piloting of an aircraft, said method comprising, during a flight phase of said aircraft, at least two steps of measuring at least two current values of at least two respective operating parameters of said aircraft. The method comprises, for each of said at least two operating parameters, the following steps: generating an item of digital data representative of a current value of this operating parameter; identifying a current range within which an index lies, each range from said at least two ranges of indices being associated with a specific display configuration of said item of digital data; and displaying said item of digital data on at least one page of symbologies according to said specific display configuration corresponding to said current range.

20 Claims, 5 Drawing Sheets

(56) References Cited

U.S. PATENT DOCUMENTS

| | | | |
|---|---|---|---|
| 6,195,598 B1 | 2/2001 | Bosqui et al. | |
| 10,173,787 B1 | 1/2019 | Oltheten et al. | |
| 10,388,171 B2* | 8/2019 | Liberman | G08G 5/54 |
| 2001/0044679 A1 | 11/2001 | Permanne | |
| 2005/0278084 A1 | 12/2005 | Certain | |
| 2006/0064959 A1* | 3/2006 | Simoni | G01C 23/00 |
| | | | 60/803 |
| 2006/0287778 A1 | 12/2006 | Oltheten et al. | |
| 2008/0198040 A1 | 8/2008 | Cottet | |
| 2011/0071708 A1 | 3/2011 | Chaniot et al. | |
| 2012/0253560 A1 | 10/2012 | Corpron et al. | |
| 2013/0054053 A1 | 2/2013 | Greenfield et al. | |
| 2017/0341771 A1 | 11/2017 | Casolaro et al. | |
| 2018/0322792 A1* | 11/2018 | Pratap | G08G 5/26 |
| 2019/0176862 A1* | 6/2019 | Kumar | B61L 25/025 |
| 2023/0114485 A1* | 4/2023 | Tucker | G01M 15/05 |
| | | | 701/31.4 |

FOREIGN PATENT DOCUMENTS

| | | |
|---|---|---|
| FR | 2756256 A1 | 5/1998 |
| FR | 2772718 A1 | 6/1999 |
| FR | 2871520 A1 | 12/2005 |
| FR | 2888638 A1 | 1/2007 |
| FR | 2950324 A1 | 3/2011 |
| FR | 2973340 A1 | 10/2012 |
| FR | 3051772 A1 | 12/2017 |
| JP | 2008528372 A | 7/2008 |

* cited by examiner

METHOD AND SYSTEM FOR ASSISTING THE PILOTING OF AN AIRCRAFT, AIRCRAFT EQUIPPED WITH SUCH A SYSTEM

CROSS REFERENCE TO RELATED APPLICATIONS

This application claims priority to French patent application No. FR 2203512 filed on Apr. 15, 2022, the disclosure of which is incorporated in its entirety by reference herein.

TECHNICAL FIELD

The present disclosure relates to a method for assisting the piloting of an aircraft.

BACKGROUND

Generally, in order to pilot a rotorcraft, it is necessary to monitor many instruments arranged on an instrument panel. These instruments are used, in particular, to inform the pilot about the external flight conditions and about certain operating parameters of the rotorcraft. Such operating parameters may, in particular, relate to an engine assembly and/or a main gearbox referred to hereinafter for convenience as the "MGB" and concern the temperature and/or the pressure of fluids circulant in these members.

Moreover, for physical reasons, there are many limitations, in particular thermal limitations, that the pilot must take into considerations at all times during flight.

Furthermore, some rotorcraft are equipped, in particular, with one or more free turbine turboshaft engines. In this case, power is taken from a stage referred to as the "low-pressure" stage of the turbine, which stage is mechanically separate from a compressor assembly and a stage referred to as the "high-pressure" stage of the turbine. Since a turboshaft engine rotates at between 30,000 and 50,000 rpm, the main gearbox allows the rotational speed output by the engine assembly to rotate the rotor (or rotors) of the rotorcraft to be reduced to a rotational speed NR of the order of 300 to 400 rpm, for example.

Furthermore, the engine manufacturer uses calculations or tests to establish the curves of the available power of a turboshaft engine, for each permitted operating rating, depending, in particular, on the altitude and the temperature.

Such curves then define limitations that can be monitored, for example, by means of several operating parameters of the rotorcraft, i.e., the rotational speed of an engine, the torque (TQ) related to the operation of the engine and the MGB and the temperature of the engine gases (T4).

The values of these parameters may be displayed on various dials.

Document FR 2 749 545 describes a flight control indicator that identifies which of the monitored parameters of the turboshaft engine is closest to its limit. Information relating to the limitations that need to be observed is grouped together on a single display, making it possible to produce a summary and to display only the result of this summary so as to simplify the pilot's task, while also saving space on the instrument panel. This singles out a "limiting parameter" from the monitored parameters of the turboshaft engine, the current value of which is the closest to the limit value for said parameter. For this reason, such an indicator will also be referred to hereinafter as a "first-limitation instrument" or "FLI".

Furthermore, variants of this FLI allow the value of the limiting parameter to be displayed as a power equivalent, i.e., as a power margin such as +10% of the MTOP, for example, or as a pitch margin, the pitch indicating the position of the blades of the rotor of the rotorcraft in relation to the incident wind.

Furthermore, the use of these different parameters in order to implement power margin indicators is known, as described in documents FR 2 756 256 and FR 2 973 340, and documents US 2013/054053 and CN 105 416 601, such a margin possibly being expressed as a collective pitch value of a main rotor, providing the pilot (or pilots) with a summary indication of the available power margins, replacing several conventional indicators that are typically scattered over the instrument panel.

Furthermore, on some helicopters, the current values of the different operating parameters of the engine and the MGB may be displayed permanently on a dedicated display device, in which case it is possible for a pilot to see what the values of these different parameters are and possibly if one of these values is approaching a limit.

However, when the aircraft does not have this dedicated display device, the pilot has no way of knowing which parameter is approaching its limit. The fact that the limit has been exceeded can only be indicated once this limit is reached.

Moreover, permanently displaying the current values of the operating parameters of the engine and/or the MGB on a dedicated page of a second screen may be disadvantageous because the second screen can then no longer be used to display information necessary to the mission.

Another known document is FR 2 950 324, which describes a method and a device for assisting the piloting of an aircraft in the event of failure of a first-limitation indicator.

Such a document discloses keeping each monitored parameter (Ng, T4, Tq) below a predetermined threshold when the first-limitation indicator is no longer able to display the information corresponding to the FLI scale.

Document FR 2 871 520 discloses a flight control indicator that can be used to predict changes in the monitored parameters of a turboshaft engine.

Document FR 3 051 772 describes a method and a device for assisting the piloting of an aircraft. It proposes allowing the engine control to exceed the limitation in the event of an increase in the collective pitch.

Document FR 2 772 718 describes a first-limitation instrument identifying which of the monitored parameters of the turboshaft engine is closest to its limit. Information relating to the limitations that need to be observed are therefore grouped together on a single display. It also describes a method for assisting the piloting of an aircraft comprising, during a flight phase of the aircraft, at least two steps of measuring at least two current values of at least two respective operating parameters of the aircraft.

Document FR 2 888 638 relates to a flight control indicator of an aircraft comprising information sources, means for processing information received from the information sources and display means suitable for displaying the data from the processing means on at least one display screen.

Furthermore, the information sources determine the values of parameters relating to a propeller and a turbine of a turboprop engine, in addition to the values of parameters relating to the aircraft; the processing means use these values to calculate a power parameter that takes into account the ratio between the current power of the turboprop engine and the maximum power obtained without air bleed at sea level in standard atmosphere; and the display means show at least one characteristic sign illustrating the power parameter on the display screen.

Display means (5) show a dial (12) on the display screen (7) with percentage markings (from 0% to 100%) and whose maximum ("10", i.e., 100%) represents the maximum power PWRmax.

Document U.S. Pat. No. 10,173,787 describes another first-limitation instrument for a twin-engine rotorcraft (10) with a rotor (12).

Such a first-limitation instrument comprises a display (40) designed to dynamically redefine the information communicated to a pilot.

The twin-engine rotorcraft (10) comprises a plurality of sensors for measuring parameters such as the speed of the power turbine (Np), the speed of the main rotor (Nr), the engine torque (Qe), the measured temperature of the gas turbine (MGT), the speed of the gas turbine (Ng) and the mast torque (Qm).

A power gauge (42) is constructed and arranged to provide a combined indication of MGT, Ng, Qe and Qm in order for the relationship between these parameters and several operating limits to be displayed via a single indicator needle.

Furthermore, a bar-graph indicator (50) may display the value of the rotational speed of the main rotor (Nr) (72), and this value (72) may be colored depending on the flight conditions.

Moreover, this value of the speed of the main rotor is defined as being a percentage of a reference value lying between 97% (as shown in FIG. 4D) and 103% (as shown in FIG. 4A), for example.

Document US 2001/044679 describes another first-limitation instrument but without displaying digital data representative of a current value of an operating parameter.

SUMMARY

An object of the present disclosure is thus to propose an alternative method and device for assisting the piloting of an aircraft. This piloting assistance method and device provide a solution intended to limit the workload of a pilot and to make it easier for the pilot to identify the origin of a risk of a limit of one of the operating parameters of the engine and the MGB being exceeded.

This improves flight safety because the pilot can plan his or her piloting manoeuvres or indeed perform a piloting action that helps prevent this limit from being exceeded.

The disclosure therefore relates to a method for assisting the piloting of an aircraft, the method comprising, during a flight phase of the aircraft, at least two steps of measuring at least two current values of at least two respective operating parameters of the aircraft.

Furthermore, the expression "at least two steps of measuring at least two current values of at least two respective operating parameters of the aircraft" means that each measuring step measures a current value of an operating parameter of the aircraft.

According to the disclosure, such a method is remarkable in that it comprises, for each of the at least two operating parameters, the following steps:

generating an item of digital data representative of a current value of this operating parameter;
identifying a current range within which an index lies, this index being chosen from the group comprising the current value, a speed of variation over time of the current value and a current value corrected as a function of the speed of variation over time of the current value, the current range being identified from at least two ranges of indices, each range from said at least two ranges of indices being associated with a specific display configuration of the item of digital data, two distinct configurations associated with two different ranges being different from each other, said distinct configurations being respectively identical for each of said at least two operating parameters; and
displaying the item of digital data on at least one page of symbologies according to said specific display configuration corresponding to the current range.

Furthermore, the index corresponding to the speed of variation over time of the current value may be determined from several current values of a parameter measured during a predetermined time period.

Moreover, the expression "said distinct configurations being respectively identical for each of said at least two operating parameters" should be understood to mean that each item of digital data is displayed in an identical manner in each of the display configurations. Therefore, the display configurations of the digital values corresponding to one operating parameter are identical to the display configurations of the digital values corresponding to another operating parameter.

This means that, depending on the display configuration of each item of digital data, the pilot can quickly identify the range within which the index of the operating parameter in question is located. By choosing the ranges in a suitable manner, the pilot can determine whether the operating parameter of the aircraft is approaching a limit before this limit is exceeded. Such a limit may lie within a third range that is distinct from a first range and a second range, the limit being a limit value of this third range, for example. These first, second and third ranges of indices therefore belong to the at least two ranges.

As already disclosed, the operating parameters of the aircraft may be parameters related to the operation of the engine and the MGB. The method is applicable for one or more of the following operating parameters: a rotational speed of a gas generator (N1) of an engine of the aircraft, a first torque (TQ1) related to the operation of the engine, a second torque (TQ2) related to the operation of a main gearbox, a temperature (T4) of the engine gases and a rotational speed (NR) of a rotor equipping the aircraft.

The workload of the pilot is therefore reduced because simply viewing the current display configuration informs the pilot as to the range of values within which the item of digital data is located.

Therefore, as long as the items of digital data are displayed in a first display configuration that is distinct from a second display configuration, the pilot knows that the current range within which an index lies is not at risk of exceeding a limit. The pilot therefore has no need to read the digital data that is displayed.

Moreover, the fact that the same display configurations are used for each of the different operating parameters also helps reduce the workload of the pilot, because he or she does not need to look at the displayed value or compare it with a possible limit in order to assess a margin between the current value and an associated limit.

A display zone of a given page of symbologies displayed for each item of digital data may correspond, for example, to a rectangular shape containing this item of digital data. Advantageously, the shape and size of each of the display zones may be the same for each item of digital data.

Moreover, a first range of indices may correspond to a range not at risk of exceeding a limit for each of the parameters.

A second range of indices consecutive to the first range may correspond to a range closer to a limit for each of the parameters. The risk of a limit being exceeded is therefore greater and a change to the display configuration of the item of digital data informs the pilot that the limit is being approached.

Optionally, a third range of indices may correspond to another range consecutive to the second range. This third range may therefore be closer to a limit for one of the parameters when the at least two ranges are four or more in number.

Alternatively, the at least two ranges are three in number, and a third range may correspond to a range including a limit for all of the parameters.

Furthermore, for a given configuration, the associated range is specific and different for each parameter.

The piloting assistance method may also comprise one or more of the following features.

Advantageously, the at least two ranges of indices may comprise a first range of indices, a second range of indices, a third range of indices, and a fourth range of indices, the first, second, third and fourth ranges being separate from each other.

For each parameter, the first range of indices may correspond to the level of risk furthest from a limit for the parameter in question. The second and third ranges of indices may then correspond to increasing levels of risk approaching this limit, and the fourth range of indices may correspond to this limit being exceeded.

In practice, each specific display configuration may correspond to a combination of at least a color of the item of digital data, a background color of a zone displaying the item of digital data and a color of a contour of the display zone.

According to a specific embodiment of the possible combinations for the color of the item of digital data, the background color of the display zone and the color of the contour of the display zone:
- a first predetermined display configuration may display a white color for the item of digital data, a black color for the background of the display zone and a black color for the contour of the display zone;
- a second predetermined display configuration may display a white color for the item of digital data, a black color for the background of the display zone and a white color for the contour of the display zone;
- a third predetermined display configuration may display a black color for the item of digital data, an amber color for the background of the display zone and an amber color for the contour of the display zone; and
- a fourth predetermined display configuration may display a black color for the item of digital data, an amber color for the background of the display zone and a white color for the contour of the display zone.

Optionally, in addition to these four predetermined display configurations, a fifth predetermined display configuration may display a white color for the item of digital data, a red color for the background of the display zone and a red color for the contour of the display zone.

Moreover, the displaying of each item of digital data may be effected in a column in said at least one page of symbologies, at least one item of digital data being arranged above another item of digital data.

As a result, the display zones corresponding to each of the items of digital data are then superposed and may correspond to rectangular cells forming a column. Therefore, the contours of two adjacent display zones may merge with each other or may come into contact with each other.

According to a first embodiment of the disclosure, said at least one page of symbologies may comprise a single page chosen from a group comprising a page referred to as the "FND" or "Flight Navigation Display" page, relating to the in-flight navigation of the aircraft, and a page referred to as the "VMD" or "Vehicle Management Display" page, relating to the operation of the aircraft.

In other words, each item of digital data may be displayed on a single page of symbologies on a display such as a screen or a helmet visor. Preferably, the page of symbologies may then be the FND page. Such an FND page may in particular comprise an item of information relating to heading, altitude, course to follow, etc., providing any information useful for navigating the aircraft.

Alternatively, the page of symbologies may be the VMD page. Such a VMD page may in particular comprise an item of information relating to pressure, temperature, fuel level, electric charge, etc., providing any information useful for the correct operation of the aircraft.

According to a second embodiment of the disclosure, said at least one page of symbologies may comprise a page referred to as the "FND" page, relating to the in-flight navigation of the aircraft, and a page referred to as the "VMD" page, relating to the operation of the aircraft.

In other words, each item of digital data may be displayed on several pages of symbologies such as the FND page and the VMD page. These pages may then be displayed simultaneously or alternately one after another on one or more displays.

Furthermore, according to another example, the aircraft being able to comprise at least two engines, the method may comprise identifying an operating mode of the aircraft from at least a mode referred to for convenience as the "AEO" mode, in which all of said at least two engines are operational, a mode referred to for convenience as the "OEI" mode, in which one of said at least two engines has failed and a mode referred to for convenience as the "OEI training" mode in which a failure of one of said at least two engines is simulated for pilot training purposes.

In other words, the method may comprise a step of identifying an operating mode of the aircraft. This identification of an operating mode may be implemented in such a way as to modify the display of each of the items of digital data. Such a step of identifying an operating mode of the aircraft may be implemented when the aircraft is started up or indeed during flight, for example at the pilot's request or indeed automatically.

Advantageously, depending on the identification of the operating mode of the aircraft, at least one of the at least two ranges of indices may be variable.

In other words, a limit value or the limit values of one of the ranges of indices may change depending on the operating mode of the aircraft, for at least one of the parameters.

Therefore, in the AEO mode, the respective limit values of the ranges of indices may be less than or greater than the respective limit values of the ranges of indices corresponding to the OEI mode or the OEI training mode.

In practice, in the AEO mode, at least one range from the at least two ranges of indices may be defined by a first pair of limit values, in the OEI mode, this range of indices may be defined by a second pair of limit values, and in the OEI training mode, this range of indices may be defined by a third pair of limit values, at least one of the first, second and third pairs of limit values being distinct from at least one other pair of limit values from said first, second and third pairs of limit values.

For example, one of the lower or higher limit values of the first pair of limit values may be less than or greater than the lower or higher limit value of the second pair of limit values. This lower or higher limit value of the second pair of limit values may be equal to the lower or higher limit value of the third pair of limit values.

According to another example, one of the lower or higher limit values of the first pair of limit values may for example be equal to the lower or higher limit value of the second pair of limit values. This lower or higher limit value of the second pair of limit values may be less than or greater than the lower or higher limit value of the third pair of limit values.

According to yet another example, one of the lower or higher limit values of the first pair of limit values may for example be distinct from the lower or higher limit value of the second pair of limit values, which is itself distinct from the lower or higher limit value of the third pair of limit values. This lower or higher limit value of the first pair of limit values is also distinct from the lower or higher limit value of the third pair of limit values.

According to a particular embodiment, at least one range from the at least two ranges of indices may be predetermined for at least one of said at least two parameters.

In other words, the range or ranges of indices may be fixed, determined by tests, trials or simulations and/or may be calculated before the aircraft is used. This or these ranges of indices may therefore be stored in a memory for use during flight when the aircraft is used. Such a memory may advantageously be embedded in the aircraft.

Moreover, the at least two operating parameters of the aircraft may be chosen from a group comprising a rotational speed of a gas generator (N1) of an engine of the aircraft, a first torque (TQ1) related to the operation of the engine, a second torque (TQ2) related to the operation of a main gearbox, a temperature (T4) of the engine gases and a rotational speed (NR) of a rotor equipping the aircraft.

Such operating parameters of the aircraft therefore allow the components that are the most critical and necessary for piloting an aircraft to be monitored.

According to one advantageous example, the method may comprise measuring a speed of movement of the aircraft in relation to the air, at least one range from the at least two ranges of indices being variable depending on the measurement of the speed of movement for at least one of said at least two parameters.

For example, when the measurement of the speed of movement is less than a predetermined threshold value, a range of indices may be defined by a first pair of limit values and, when the measurement of the speed of movement is greater than or equal to this predetermined threshold value, this range of indices may be defined by a second pair of limit values. Therefore, at least one of the two limit values of the first pair may be different from the limit values of the second pair. The two limit values of the first pair may optionally be different from the two limit values of the second pair.

Advantageously, the method may comprise an alert triggered when the current range from the at least two ranges of indices changes.

Such an alert may be generated by an alerter generating a audible, visual or vibratory signal. For example, a light or a diode may be illuminated or flash to warn the pilot that the current range has changed. A written message may also be displayed on the display for displaying the digital data.

A siren or any audible signal may be emitted by a buzzer or by a loudspeaker.

The object of the present disclosure is also a system for assisting the piloting of an aircraft, the system comprising at least two sensors measuring at least two current values of at least two respective operating parameters of the aircraft.

According to the disclosure, this system is remarkable in that it comprises:
  a computer generating, for each of the at least two operating parameters, one item of digital data representative of a current value of an operating parameter;
  an identification unit configured to identify, for each of the at least two operating parameters, a current range within which an index lies, the index being chosen from the group comprising the current value, a speed of variation over time of the current value and a current value corrected as a function of the speed of variation over time of the current value, the current range being identified from at least two separate ranges of indices, each range from said at least two ranges of indices being associated with a specific display configuration of said item of digital data, two distinct configurations associated with two different ranges being different from each other, said distinct configurations being respectively identical for each of said at least two operating parameters; and
  a display displaying the item of digital data on at least one page of symbologies according to the specific display configuration.

In other words, such a computer can be used to calculate or provide the item of digital data representative of a current value of an operating parameter. Such a computer may comprise at least one processor and at least one memory, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc.

Furthermore, such a computer may also be connected to several sensors by wired or wireless means. These sensors can be used to measure the current values of at least two operating parameters of the aircraft.

Such sensors may thus be chosen from a group comprising the sensors sensing the rotational speed of the gas generator of an engine equipping the aircraft, the sensors sensing the torque related to the operation of the engine and/or the main gearbox and the sensors sensing the temperature of the engine gases.

The computer may thus generate the item of digital data representative of a current value of an operating parameter, which item of digital data may be in the form of the current value or in the form of another value, for example by converting the current value into a piece of information representative of a percentage of a nominal reference value.

The display is connected to the computer and receives the item of digital data corresponding to each parameter by wired or wireless means. The display can therefore be used to display this item of digital data on at least one page of symbologies. Such a display may comprise a screen arranged in the cockpit, for example on an instrument panel or on a display device referred to as a "head-up" display such as a helmet visor or spectacle lenses.

The identification unit receives the different items of digital data, and is then used to identify the current ranges within which these items of digital data or their speeds of variation lie, forming an index.

Such an identification unit may be separate from or part of the computer described above, and may also be integrated into the display. This identification unit may, for example, comprise at least one processor and at least one memory, at least one integrated circuit, at least one programmable system, at least one logic circuit, these examples not limiting the scope given to the expression "identification unit". The term "processor" may refer equally to a central processing unit (CPU), a graphics processing unit (GPU), a digital signal processor (DSP), a microcontroller, etc.

The information corresponding to the identification of the current range of the index may then be transmitted to the display by wired or wireless means. The display may then adapt the display of each of the items of digital data in real time depending on the identification of the current range.

Such a display may optionally comprise a display configurator that is separate from or part of the computer and the identification unit described above. This display configurator may, for example, comprise at least one processor and at least one memory, at least one integrated circuit, at least one programmable system, at least one logic circuit, these examples not limiting the scope given to the expression "display configurator". The term "processor" may refer equally to a central processing unit (CPU), a graphics processing unit (GPU), a digital signal processor (DSP), a microcontroller, etc.

In practice, such a system may comprise a speed sensor generating a measurement of a speed of movement of the aircraft in relation to the air, at least one of the at least two ranges of indices being variable depending on the measurement of the speed of movement for at least one of said at least two parameters.

In other words, a measurement of a speed of movement is transmitted by wired or wireless means to the identification unit in order to modify at least one of the ranges of indices.

Furthermore, the disclosure also relates to an aircraft remarkable in that it comprises a piloting assistance system as cited above.

Such an aircraft is therefore able to reduce the workload of a pilot and offers an increased level of safety.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

As already mentioned, the disclosure relates to a system for assisting the piloting of an aircraft, an associated aircraft and a piloting assistance method.

Figure 1:
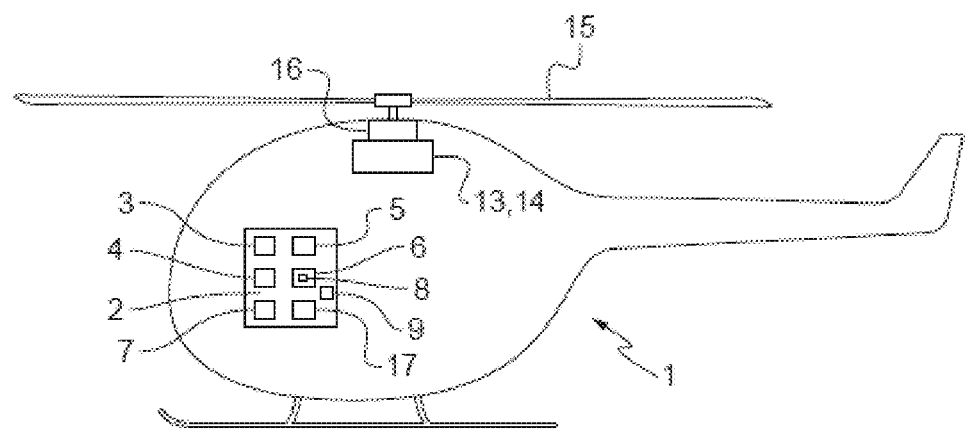
FIG. 1 is diagram of an aircraft equipped with a piloting assistance system according to the disclosure.

As shown in FIG. 1, such an aircraft 1 comprises at least one engine 13, 14, a main gearbox or MGB 16 for transmitting an engine torque generated by the engine or engines 13, 14 to a rotor 15 contributing at least to the lift of the aircraft 1. Furthermore, the aircraft 1 also comprises a piloting assistance system 2 intended at least to reduce the workload of a pilot during a mission.

This system 2 comprises at least two sensors 3, 4 measuring the current values of at least two operating parameters of the aircraft 1. For example, these at least two sensors 3, 4 may be chosen from sensors sensing torque related to the operation of an engine 13, 14 and/or the MGB 16, sensors sensing the temperature of the gases from the engine or engines 13, 14 and sensors sensing the rotational speed of the rotor 15.

The system 2 also comprises a computer 5 generating, for each of the at least two operating parameters, one item of digital data representative of a current value of an operating parameter.

The computer 5 may be connected, for example, to three sensors 3, 4 by wired or wireless means, in order to monitor three operating parameters. Naturally, more than three sensors 3, 4 may also be used to monitor more than three operating parameters of an aircraft 1.

According to this example, the computer 5 may in this case generate three items of digital data representative of the three current values of the operating parameters. Such a computer 5 may in particular convert at least one of the current values into a piece of information representative of a percentage of a nominal reference value.

The system 2 then comprises a display 6 displaying each item of digital data on at least one page of symbologies. Such a display 6 is shown in greater detail in FIG. 2 and has, for example, three items of digital data 11, 11', 11" representative of the current values of three operating parameters.

The display 6 may be connected to the computer 5 and receives, by wired or wireless means, the three items of digital data 11, 11', 11" corresponding to the three parameters. The display 6 can therefore be used to display these three items of digital data 11, 11', 11" on at least one page of symbologies.

Such a display 6 may comprise a screen arranged in the cockpit, for example on an instrument panel or a display device referred to as a "head-up" display such as a helmet visor or spectacle lenses.

Moreover, the system 2 also comprises an identification unit 7 for identifying a current range within which an index lies. Such an index may be formed either directly by the current value or by a speed of variation over time of this current value, such a speed of variation being determined, for example, from several current values measured over a predetermined time period.

The current range is then identified from at least two ranges of indices separate from each other, these at least two ranges of indices optionally being consecutive.

When two ranges of indices are consecutive, they have the same limit value that is excluded from a first range and included in the other range.

The identification unit 7 may be part of or separate from the computer 5. The identification unit 7 may thus be connected to the computer 5 by wired or wireless means.

For example, a first range of indices may be formed by all of the values less than a threshold value and a second range of indices may be formed by all of the values greater than or equal to this same threshold value.

Furthermore, these at least two ranges of indices are advantageously predetermined by tests, trials, simulations or calculations prior to the mission of the aircraft 1. These at least two ranges of indices are then stored in a memory that may for example be embedded in the aircraft 1. These at least two ranges of indices may also be calculated during flight, possibly depending on measurements of physicochemical parameters relating, for example, to the surrounding environment in which the aircraft 1 is moving.

As shown, the display 6 may also comprise a display configurator 8 that can be used to modify the display of each of the items of digital data 11, 11', 11". The display configurator 8 may thus be connected to the identification unit 7 by wired or wireless means.

Alternatively, this display configurator 8 may be part of or separate from the computer 5 and the identification unit 7. The display configurator 8 may therefore be connected by wired or wireless means to the identification unit 7 and the computer 5.

Such a display configurator 8 may therefore display the item of digital data 11, 11', 11" in at least two display configurations corresponding respectively to at least two ranges of indices. Each display configuration may thus correspond to a combination of at least a color of the item of digital data 11, 11', 11", a background color of a display zone 10, 10', 10" for the item of digital data 11, 11', 11" and a color of a contour 12, 12', 12" of the display zone 10, 10, 10", each combination being different from the other combinations.

Such at least two display configurations therefore comprise a first predetermined display configuration when the current range is a first range, and a second predetermined display configuration when the current range is a second range, and so on, each predetermined display configuration being different from the other predetermined display configuration or configurations.

For example, in a first display configuration, the item of digital data 11, 11', 11" may be a white color on a black background and surrounded by a black contour 12, 12', 12" that is therefore merged with the background of a display zone 10, 10', 10".

In a second display configuration, the item of digital data 11, 11', 11" may by a white color on a black background and surrounded by a white contour 12, 12', 12" that contrasts with the black background of a display zone 10, 10', 10".

This second display configuration of the item of digital data 11, 11', 11" therefore informs the pilot in a very simple manner that the current range has changed and is the second range.

In practice, the system 2 may comprise a speed sensor 9 generating a measurement of a speed of movement of the aircraft 1 in relation to the air, at least one of the at least two ranges of indices being variable depending on the measurement of the speed of movement originating from this speed sensor 9.

For example, the different limit values of such a variable range of indices may be predetermined and stored in a memory in the form of a table or a chart having at least two rows and at least two columns. Each column of the chart corresponds to a predetermined range of speeds and each row comprises the limit values of a predetermined range of indices associated with the range of speeds.

The speed sensor 9 transmits the measurement of the speed of movement to the identification unit 7 by wired or wireless means. This identification unit 7 may modify one or more limit values of one of the ranges of indices depending on this speed measurement.

The system 2 may also include an alerter 17 suitable for generating at least one alert. Such an alert may be in the form of a visual alarm, for example emitting a light with a light-emitting diode or an equivalent or one or more characters being displayed on a screen, an audible alarm, via a loudspeaker, and/or a haptic alarm, for example by means of a vibrating unit causing a member held or worn by the pilot of the aircraft 1 to vibrate.

FIGS. 3 to 6 show different examples of methods in which, for the purposes of simplification and improved readability, these methods are depicted allowing only two different operating parameters to be monitored.

Figure 3:
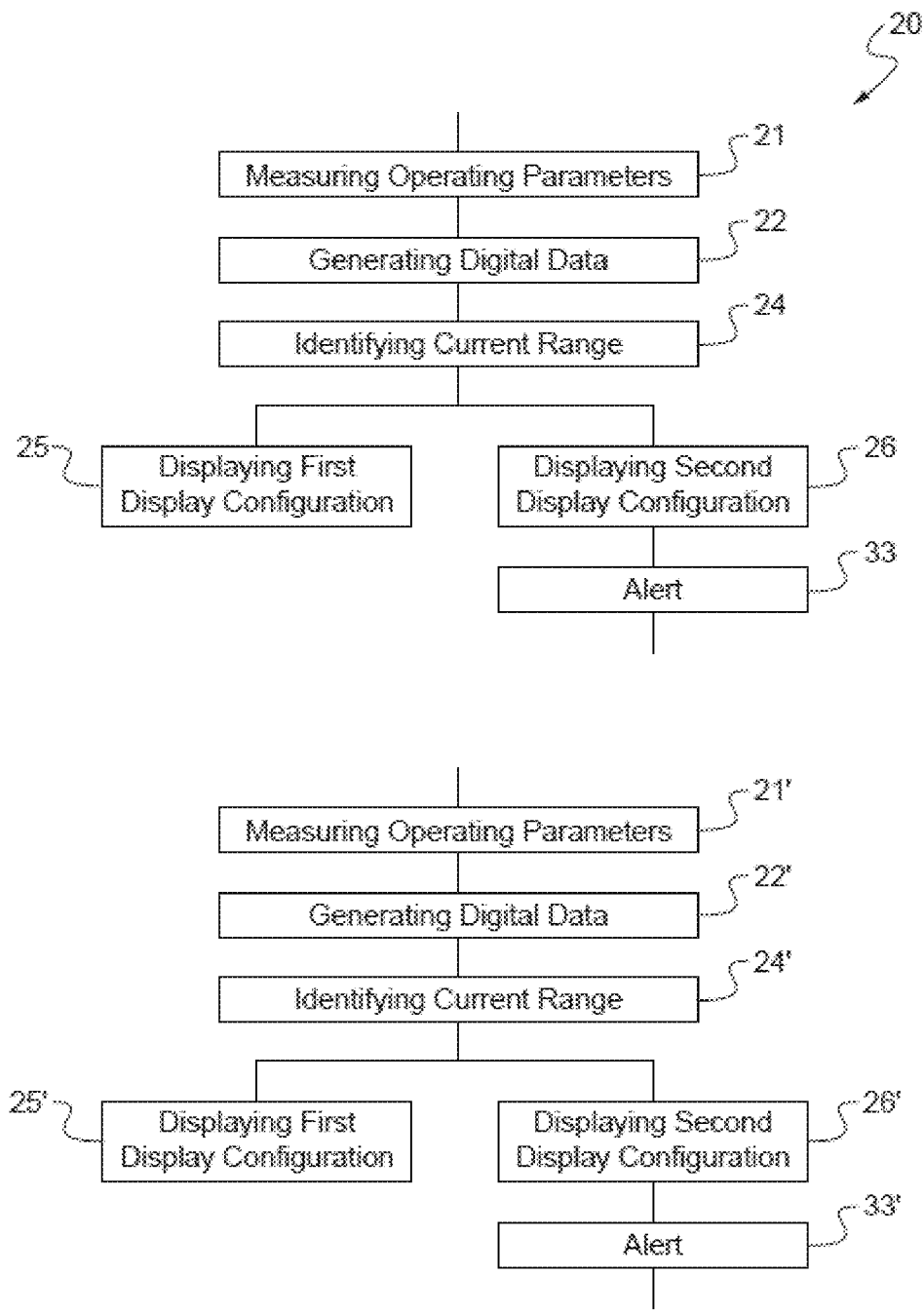
FIG. 3 is a logic diagram showing a first example of a piloting assistance method according to the disclosure.

As shown in FIG. 3, the disclosure also relates to a method 20 for assisting the piloting of an aircraft 1.

This method 20 comprises at least two steps 21, 21' of measuring the current values of at least two distinct operating parameters as described above. These measuring steps 21 and 21' are performed in flight during a mission of the aircraft 1 in order to help the pilot monitor the safety of his or her piloting manoeuvres.

Therefore, the method 20 comprises, for each of the monitored operating parameters, generating 22, 22' an item of digital data 11, 11' representative of the current value of the operating parameter. Each sensor 3, 4 therefore implements a measuring step 21 and 21' and transmits the current value of the parameter to the computer 5 to generate 22, 22' an item of digital data 11, 11'.

The method 20 then comprises identifying 24, 24' the current range with the identification unit 7. Such a current range is the range within which the current value or the speed of variation over time of the current value lies, the current range being identified from at least two ranges of indices.

Therefore, as long as the current range is a first range, the method 20 comprises displaying 25, 25' the item of digital data 11, 11' on at least one page of symbologies, according to the first predetermined display configuration.

However, when the current range is identified as being a second range, the method 20 comprises displaying 26, 26' the item of digital data 11, 11' according to the second predetermined display configuration.

Furthermore, the method 20 may comprise an alert 33, 33' triggered when the current range changes from the first range to the second range. Such an alert 33, 33' may be implemented by the alerter 17 of the system 2 or by any other separate alerter.

Moreover, the current range may also be identified, for example, from four ranges of indices comprising a first range of indices, a second range of indices, a third range of indices and a fourth range of indices, these first, second, third and fourth ranges being separate from each other.

Figure 4:
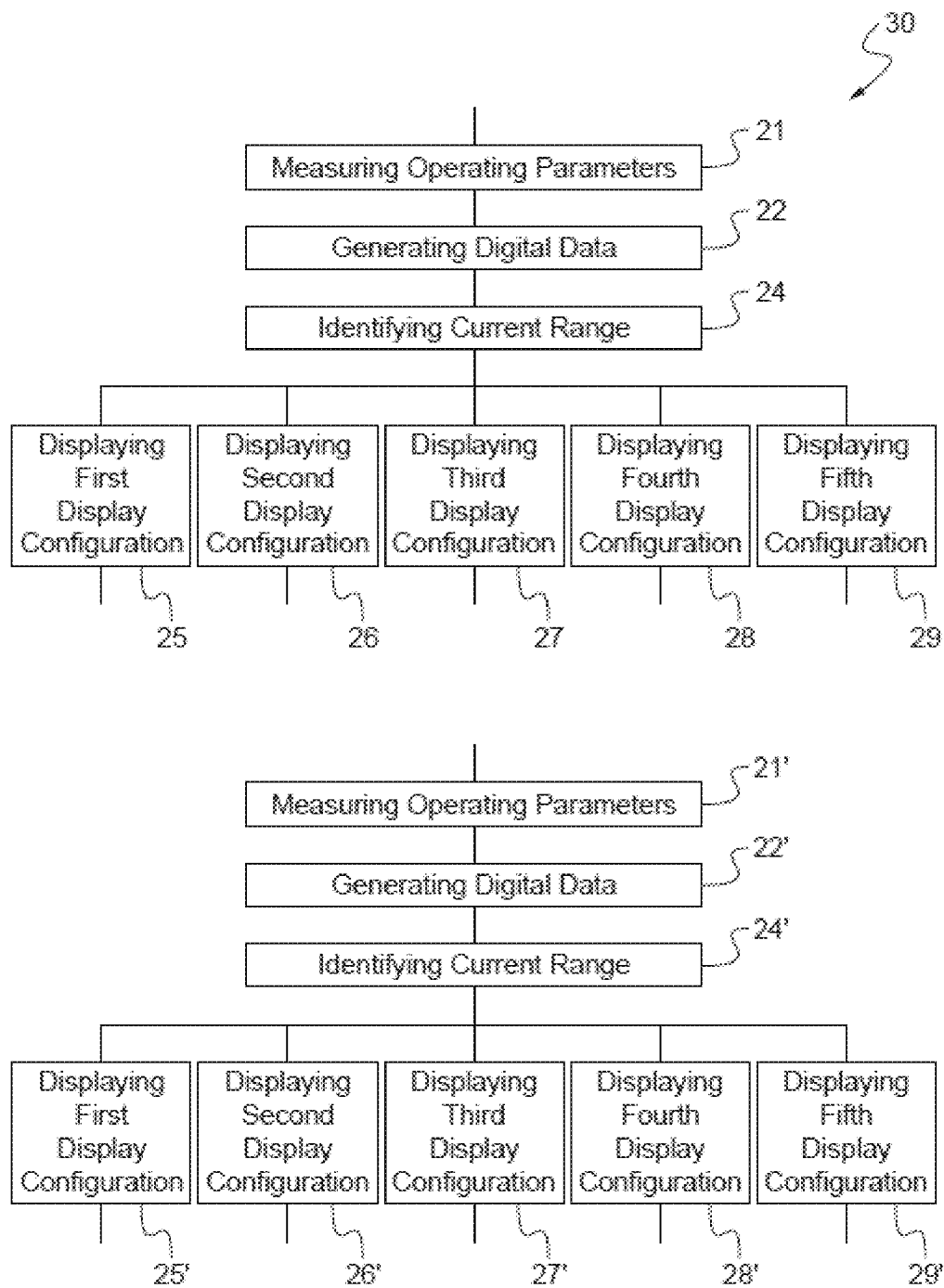
FIG. 4 is a logic diagram showing a second example of a piloting assistance method according to the disclosure.

As shown in FIG. 4, the method 30 may thus comprise, when the current range is the third range, displaying 27, 27' the item of digital data 11, 11' according to a third predetermined display configuration, when the current range is the fourth range, displaying 28, 28' the item of digital data 11, 11' according to a fourth predetermined display configuration and, possibly, when the current range is a fifth range, displaying 29, 29' the item of digital data 11, 11' according to a fifth predetermined display configuration.

Moreover, the first, second, third, fourth and fifth predetermined display configurations are distinct from each other and also correspond to distinct combinations of at least the color of the item of digital data 11, 11', the background color of the display zone 10, 10' and the color of the contour 12, 12' of the display zone 10, 10'.

Using four or five display configurations that are distinct from one another therefore makes it possible to define several alerts corresponding to several distinct limits or one alert and several pre-alerts issued depending on the identification 24, 24' of the current range.

For example, displaying 27, 27' the item of digital data 11, 11' according to the third predetermined display configuration may correspond to a first pre-alert corresponding to a first level of risk of a limit being exceeded. Displaying 28, 28' the item of digital data 11, 11' according to the fourth predetermined display configuration may correspond to a second pre-alert corresponding to a second level of risk higher than the first level of risk or indeed to an alert corresponding to the fact that the limit has been exceeded.

When implemented, displaying 29, 29' the item of digital data 11, 11' according to the fifth predetermined display configuration may correspond to an alert corresponding to the fact that the limit has been exceeded.

Alternatively, displaying 27, 27' the item of digital data 11, 11' according to the third predetermined display configuration may correspond to a pre-alert corresponding to the index approaching a first limit. Displaying 28, 28' the item of digital data 11, 11' according to the fourth predetermined display configuration may correspond to a first alert corresponding to this first limit being exceeded, relating to a first specific engine speed, for example. Displaying 29, 29' the item of digital data 11, 11' according to the fifth predetermined display configuration may correspond to a second alert corresponding to a second limit being exceeded, relating to a second engine speed, for example.

The first and second engine speeds may, for example, correspond to a speed referred to for convenience as "MCP" or maximum continuous power and a speed referred to for convenience as "MTOP" or maximum take-off power. The first limit may therefore relate to the MCP and may be lower than the second limit, which relates to the MTOP.

Figure 2:
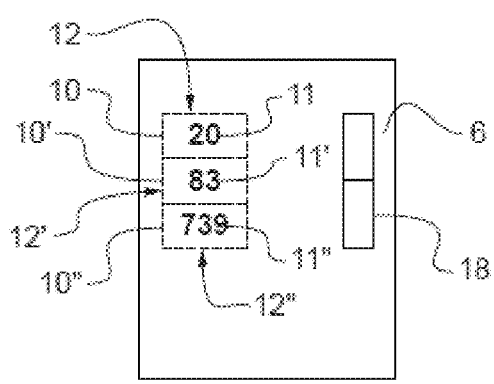
FIG. 2 is a front view of a display according to the disclosure.

As shown in FIG. 2, these displays 25, 26, 27, 28, 29, 25', 26', 27', 28', 29' of each item of digital data 11, 11' are shown, for example, in a column on the page or pages of symbologies, at least a first item of digital data 11 being arranged above a second item of digital data 11'.

This page of symbologies is advantageously a page referred to as the "FND" page, relating to the in-flight navigation of the aircraft 1 and/or a page referred to as the "VMD" page, relating to the operation of the aircraft 1.

Furthermore, the display 6 may display each item of digital data 11, 11' on the page referred to as the "FND" page, relating to the in-flight navigation of the aircraft 1, possibly in the immediate vicinity of a first-limitation instrument 18.

Figure 5:
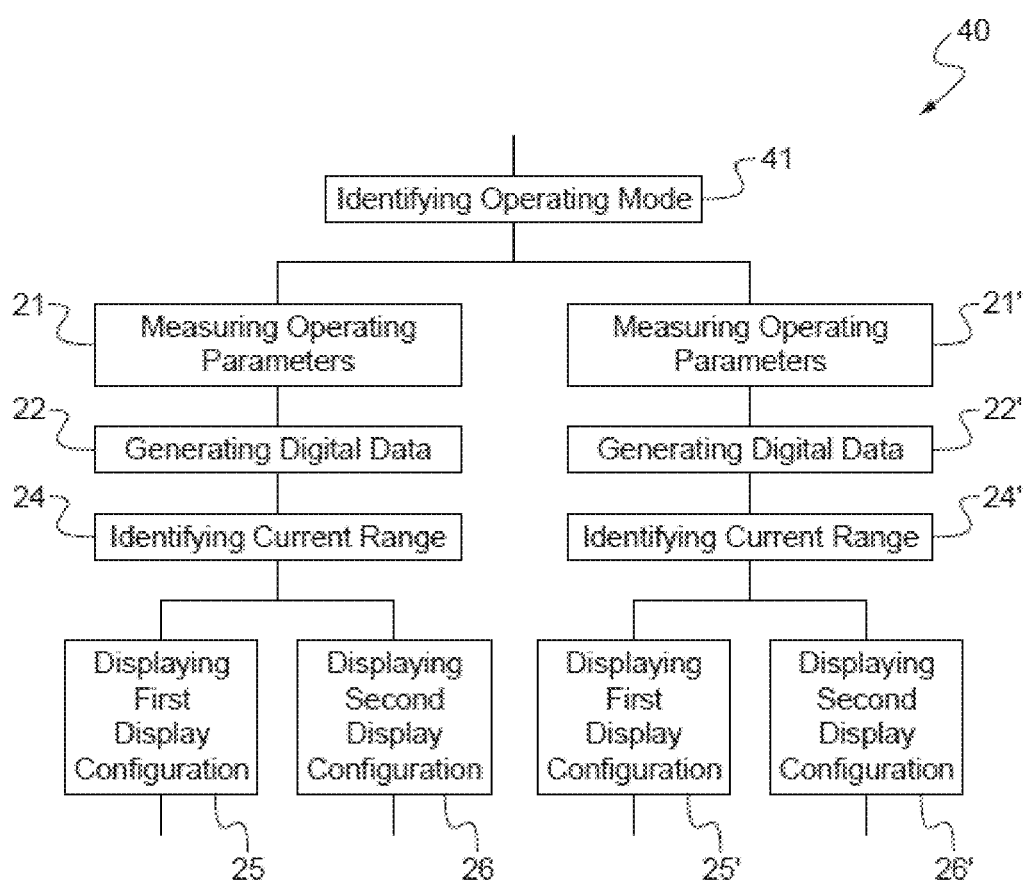
FIG. 5 is a logic diagram showing a third example of a piloting assistance method according to the disclosure.

As shown in FIG. 5, when the aircraft 1 is provided with at least two engines 13, 14, the method 40 may comprise identifying 41 an operating mode of the aircraft 1 from at least a mode referred to as the "AEO" mode in which all the engines 13, 14 are operational, a mode referred to as the "OEI" mode in which one of the engines 13, 14 has failed and a mode referred to as the "OEI training" mode in which a failure of one of the engines 13, 14 is simulated for pilot training purposes.

Therefore, depending on this identification 41 of the operating mode of the aircraft 1, at least one of the at least two ranges of indices may be modified, or indeed all of the ranges of indices may be modified.

Each range of indices corresponding to the different operating modes of the aircraft 1, AEO, OEI or OEI training, may be predetermined and stored in a memory. Therefore, the step 24, 24' of identifying the current range within which an index lies may use this memory and select, for each identified operating mode, the at least two ranges of indices that allow the current range to be identified.

For example, the different ranges of indices may be predetermined and stored in a memory in the form of a table or a chart having at least two rows and at least two columns. Each column of the chart corresponds to an operating mode and each row corresponds to a predetermined range of indices.

For example, in this case, in the AEO mode, at least one of the two ranges of indices may be defined by a first pair of limit values, in said OEI mode, this range of indices may be defined by a second pair of limit values and in the OEI training mode, this range of indices may be defined by a third pair of limit values. Thus, one or more of the first, second and third pairs of limit values is or are distinct from at least one other pair of limit values from the first, second and third pair of limit values.

Figure 6:
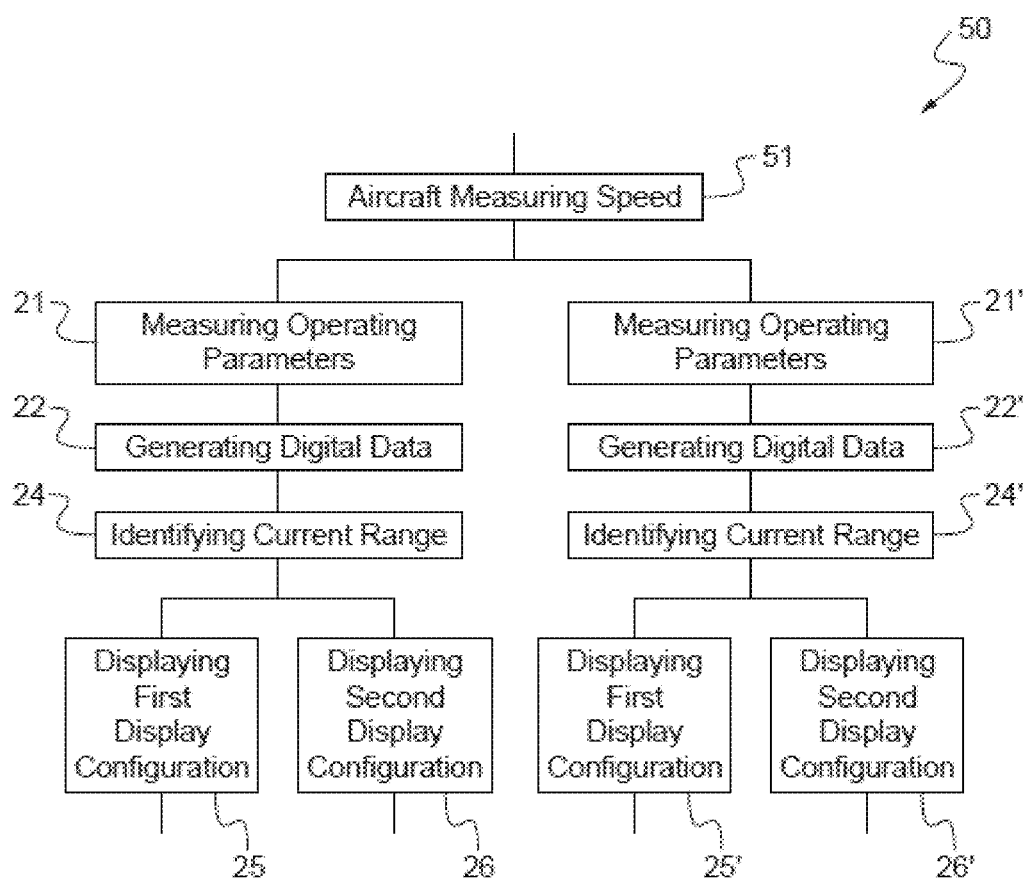
FIG. 6 is a logic diagram showing a fourth example of a piloting assistance method according to the disclosure.

Moreover, as described in FIG. 6, the method 50 may also comprise measuring 51 a speed of movement of the aircraft 1 in relation to the air, carried out by means of one or more Pitot probes, for example.

In this case, at least one of the at least two ranges of indices may be modified, or indeed all of the ranges of indices may be modified, depending on the measurement of the speed of movement of the aircraft 1.

Each range of indices corresponding to a speed of movement of the aircraft 1 may be predetermined and stored in a memory. Therefore, the step 24, 24' of identifying the current range within which an index lies may use this memory and select, for each measurement of a speed of movement, the at least two ranges of indices that allow the current range to be identified.

The speed sensor 9 described above may therefore perform this measurement 51 of a speed of movement of the aircraft 1.

For example, below a speed of movement of 40 knots, one knot being equal to 1.151 miles per hour, the first range of indices may lie between 0% and 85%, whereas at speeds higher than 40 knots, this first range of indices lies between 0% and 82%. This percentage may further correspond to a value of the torque related to the operation of an engine 13, 14 and/or a main gearbox or MGB 16 and is expressed in comparison to a nominal reference value corresponding to an index of 100%.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A method for assisting the piloting of an aircraft, the method comprising, during a flight phase of the aircraft, at least two steps of measuring at least two current values of at least two respective operating parameters of the aircraft,
wherein the method comprises, for each of the at least two operating parameters, the following steps:
generating, by a computer processing output from a sensor measuring the operating parameter, an item of digital data representative of a current value of the operating parameter;

identifying a current range within which an index lies, the index being chosen from the group comprising the current value, a speed of variation over time of the current value and a current value corrected as a function of the speed of variation over time of the current value, the current range being identified from at least two separate ranges of indices, each range from the at least two ranges of indices being associated with a specific display configuration of the item of digital data, two distinct configurations associated with two different ranges being different from each other, the distinct configurations being respectively identical for each of the at least two operating parameters; and displaying the item of digital data on at least one page of symbologies according to the specific display configuration corresponding to the current range.

2. The method according to claim 1,
wherein the at least two ranges of indices comprise a first range of indices, a second range of indices, a third range of indices and a fourth range of indices, the first, second, third and fourth ranges being separate from each other.

3. The method according to claim 1, wherein the at least two ranges of indices comprise a first range of indices, a second range of indices, a third range of indices and a fourth range of indices, the first, second, third and fourth ranges being separate from each other and wherein each specific display configuration corresponds to a combination of at least a color of the item of digital data, a background color of a display zone displaying the item of digital data and a color of a contour of the display zone.

4. The method according to claim 1,
wherein the displaying of each item of digital data is effected in a column in the at least one page of symbologies, at least one item of digital data being arranged above another item of digital data.

5. The method according to claim 1,
wherein the at least one page of symbologies comprises a single page chosen from a group comprising a page referred to as the "FND" page, relating to the in-flight navigation of the aircraft, and a page referred to as the "VMD" page, relating to the operation of the aircraft.

6. The method according to claim 1,
wherein the at least one page of symbologies comprises a page referred to as the "END" page, relating to the in-flight navigation of the aircraft, and a page referred to as the "VMD" page, relating to the operation of the aircraft.

7. The method according to claim 1,
wherein, the aircraft comprising at least two engines, the method comprises identifying an operating mode of the aircraft from at least one mode referred to as the "AEO" mode in which all of the at least two engines are operational, a mode referred to as the "OEI" mode in which one of the at least two engines has failed and a mode referred to as the "OEI training" mode in which a failure of one of the at least two engines is simulated for pilot training purposes.

8. The method according to claim 7,
wherein, depending on the identification of the operating mode of the aircraft, at least one of the at least two ranges of indices is variable for at least one of the at least two parameters.

9. The method according to claim 8,
wherein, in the "AEO" mode, at least one range from the at least two ranges of indices is defined by a first pair of limit values, in the "OEI" mode, the at least one range is defined by a second pair of limit values and in the "OEI training" mode, the at least one range is defined by a third pair of limit values, at least one of the first, second and third pairs of limit values being distinct from at least one other pair of limit values from the first, second and third pairs of limit values.

10. The method according to claim 1,
wherein at least one range from the at least two ranges of indices is predetermined for at least one of the at least two parameters.

11. The method according to claim 1,
wherein the at least two operating parameters of the aircraft are chosen from a group comprising a rotational speed of a gas generator of an engine of the aircraft, a first torque related to the operation of the engine, a second torque related to the operation of a main gearbox, a temperature of the gases of the engine and a rotational speed of a rotor equipping the aircraft.

12. The method according to claim 1,
wherein the method comprises measuring a speed of movement of the aircraft in relation to the air, at least one range from the at least two ranges of indices being variable depending on the measurement of the speed of movement.

13. The method according to claim 1,
wherein the method comprises an alert triggered when the current range from the at least two ranges of indices changes.

14. A system for assisting the piloting of an aircraft, the system comprising at least two sensors measuring at least two current values of at least two respective operating parameters of the aircraft,
wherein the system comprises:
  a computer generating, for each of the at least two operating parameters, one item of digital data representative of a current value of an operating parameter,
  an identification unit configured to identify, for each of the at least two operating parameters, a current range within which an index lies, the index being chosen from the group comprising the current value, a speed of variation over time of the current value and a current value corrected as a function of the speed of variation over time of the current value, the current range being identified from at least two separate ranges of indices, each range from the at least two ranges of indices being associated with a specific display configuration of the item of digital data, two distinct configurations associated with two different ranges being different from each other, the distinct configurations being respectively identical for each of the at least two operating parameters, and
  a display displaying the item of digital data on at least one page of symbologies according to the specific display configuration.

15. The piloting assistance system according to claim 14, wherein the system comprises a speed sensor generating a measurement of a speed of movement of the aircraft in relation to the air, at least one of the at least two ranges of indices being variable depending on the measurement of the speed of movement.

16. An aircraft wherein the aircraft comprises the piloting assistance system according to claim 14.

17. The method according to claim 1, wherein the displaying is performed on a page of symbologies selected from a Flight Navigation Display (FND) page or a Vehicle Management Display (VMD) page.

18. The method according to claim 1, wherein the displaying comprises modifying a background color, a text color, and a contour color of a rectangular display zone according to the identified range.

19. A method for assisting the piloting of an aircraft, the method comprising:
- during a flight phase of the aircraft, conducting two steps of measuring two current values of two respective operating parameters of the aircraft,
- wherein, for each of the two operating parameters, the following:
  - generating an item of digital data representative of a current value of the operating parameter;
  - identifying a current range within which an index lies, the index being from the group comprising the current value, a speed of variation over time of the current value and a current value corrected as a function of the speed of variation over time of the current value, the current range being identified from at least two separate ranges of indices, each range from the at least two ranges of indices being associated with a specific display configuration of the item of digital data, two distinct configurations associated with two different ranges being different from each other, the distinct configurations being respectively identical for each of the two operating parameters; and
- displaying the item of digital data on a page of symbologies according to the specific display configuration corresponding to the current range.

20. The method according to claim 19,
wherein, the aircraft comprising two engines, the method comprises identifying an operating mode of the aircraft from at least one mode referred to as the "AEO" mode in which all of the two engines are operational, a mode referred to as the "OEI" mode in which one of the two engines has failed and a mode referred to as the "OEI training" mode in which a failure of one of the two engines is simulated for pilot training purposes, and wherein, depending on the identification of the operating mode of the aircraft, at least one of the at least two ranges of indices is variable for one of the two parameters.

* * * * *